No. 618,212. Patented Jan. 24, 1899.
L. B. SMITH, E. R. MAINE & D. H. PITTS.
WEEDER.
(Application filed Nov. 5, 1898.)
(No Model.)
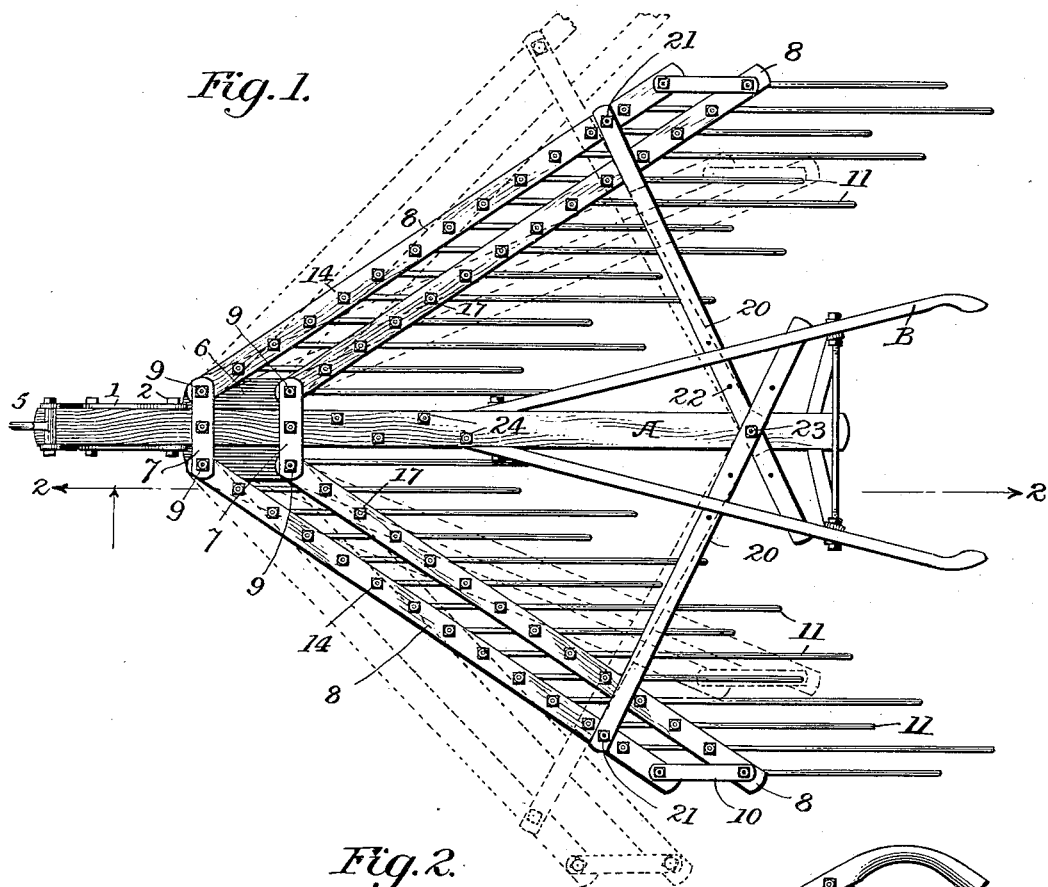
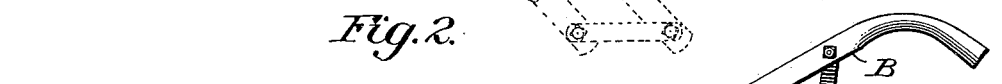
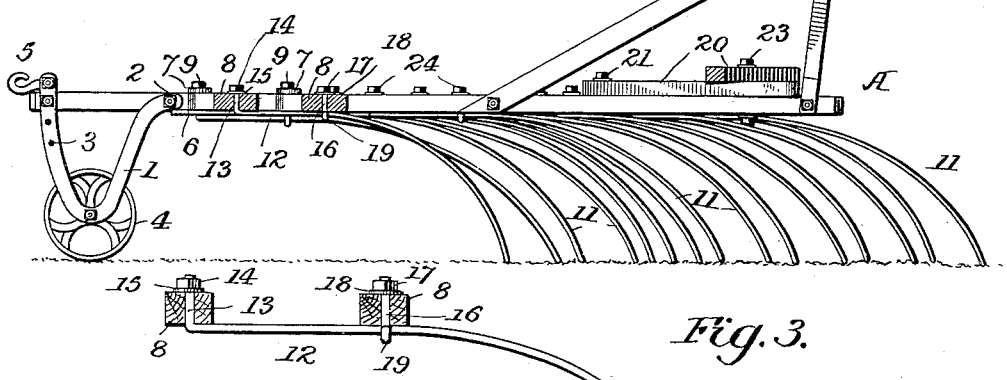

United States Patent Office.

LYMAN B. SMITH, OF MANSFIELD, EDWIN R. MAINE, OF MAINESBURG, AND DANIEL H. PITTS, OF MANSFIELD, PENNSYLVANIA, ASSIGNORS TO THE KEYSTONE FARM MACHINE COMPANY, LIMITED, OF YORK, PENNSYLVANIA.

WEEDER.

SPECIFICATION forming part of Letters Patent No. 618,212, dated January 24, 1899.

Application filed November 5, 1898. Serial No. 695,546. (No model.)

*To all whom it may concern:*

Be it known that we, LYMAN B. SMITH, residing at Mansfield, EDWIN R. MAINE, residing at Mainesburg, and DANIEL H. PITTS, residing at Mansfield, in the county of Tioga and State of Pennsylvania, citizens of the United States, have invented certain new and useful Improvements in Weeders, of which the following is a specification.

Our invention consists in various improvements in the construction and arrangement of machines commonly known as "weeders," which improvements will be hereinafter described in detail, reference being had to the accompanying drawings, in which—

Figure 1 is a plan view of our improved machine. Fig. 2 is a side view, partly in section, on the line 2 2 of Fig. 1; and Fig 3 is an enlarged detail taken on the same line.

In the drawings, A indicates a central beam to which the various parts of the machine are connected. At the rear of the machine a pair of handles B are connected to the beam in the manner in which plow and cultivator handles are usually connected. On the forward end of the beam is an adjustable wheel-frame consisting of two U-shaped bars pivoted at 2 to the beam and having at their forward ends a series of holes 3, by means of which the bars can be connected to the end of the beam. In the wheel-frame is mounted a wheel 4, and to the upper end of the bars 1 is connected a draft-hook 5. To the bottom of the beam, in the rear of the wheel-frame, is connected a rectangular metal plate 6, and over the beam are two transversely-arranged plates 7. On each side of the beam is a pair of parallel bars 8, the inner ends of the bars being arranged between the plates 6 7 and pivotally connected thereto by bolts 9, and the outer ends of the bars being connected by links 10 in such a manner that as the bars swing about the pivots 9 they always remain parallel to each other. Instead of two plates 7 a single plate similar to plate 6 may be used on the top of the beam.

The weeder is provided with a series of curved spring-wire teeth 11, which are connected to the bars 8 and curved downwardly and rearwardly to the ground. These teeth are so connected that they always remain parallel to each other and to the beam, whatever may be the adjustment of the parallel bars to which they are connected. The manner of connecting the teeth to the bars is shown best in Fig. 3. Each tooth 11 has a horizontal portion 12 and a vertical end portion 13. The portion 13 extends through a hole in the forward bar 8 and its upper end is threaded and provided with a nut 14 and washer 15, which retain the end 13 in the bar, while permitting the tooth to turn freely about the end 13 as an axis. In the rear bars 8 are vertical eye bolts 16, having nuts 17 and washers 18 at their upper ends. The teeth 11 are passed through the eyes 19, which depend from the lower side of the bars 8. The eyebolts are free to turn in the bars, and the teeth 11, having been first arranged parallel with the beam, always remain parallel.

It is important to be able to adjust the width of the machine for the purpose of regulating the distance apart of the teeth, as well as to bring the entire machine within convenient limits, and to meet the requirement for different crops. This we accomplish by connecting the outer ends of the parallel bars with the rear end of the beam. As shown, we accomplish this adjustment by using brace-rods 20, pivotally connected by bolts 21 with the forward parallel bars, said braces being provided with a series of holes 22. The parallel bars having been set at the desired angle, a bolt 23 is passed through the braces and the beam, connecting all of the parts rigidly. The dotted lines in Fig. 1 indicate the position of the parallel bars when the machine is adjusted wider and narrower than its position shown in full lines.

In the central part of the machine are two pairs of teeth, which are not laterally adjustable. Two of these teeth are connected by means of the bolts 9, which pass through the plates 6 and 7, and the other two teeth are connected by bolts 24, which pass through the beam. The forward bolts 9 and 24 may be vertical portions of the teeth similar to those which pass through the forward bars 8.

Having described our invention, what we claim, and desire to secure by Letters Patent of the United States, is—

1. In a weeder, the combination with a central beam and suitable handles, of a pair of parallel bars on each side of the beam and pivotally connected thereto, and trailing spring-wire teeth pivotally connected to said bars each tooth being arranged parallel with the beam and connected to both bars of the pair, and means for adjusting the parallel bars, substantially as described.

2. In a weeder, the combination with the beam, suitable handles therefor, and the plates 6 and 7 connected to the beam, of two pairs of parallel bars pivotally connected to said plates, a pair of brace-rods for adjustably connecting the outer ends of the bars with the beam, and a series of spring-wire teeth having straight portions arranged parallel with the beam, the forward end of each tooth being vertical and extending through one of the bars and the rear bars being provided with eyebolts through which the teeth pass, substantially as described.

3. In a weeder, the combination of the beam, suitable handles therefor, a wheel-frame and wheel on the forward end of the beam, plates 6 and 7 connected with the beam in the rear of the wheel-frame, pairs of parallel bars pivotally connected to said plates on opposite sides of the beam, links connecting the outer ends of the parallel bars, brace-rods adjustably connecting the parallel bars with the rear end of the beam, a series of downwardly and rearwardly curved spring-teeth having straight portions extending between the parallel bars, eyebolts in the rear bars through which the teeth pass, the ends of said teeth being bent vertically and extending through holes in the forward bars, and said teeth being arranged to remain at all times parallel with each other and with the beam, substantially as described.

In testimony whereof we affix our signatures in presence of two witnesses.

LYMAN B. SMITH.
EDWIN R. MAINE.
DANIEL H. PITTS.

Witnesses:
W. P. AUSTIN,
H. E. CARR.